US012684066B2

(12) United States Patent
Ashfield et al.

(10) Patent No.: US 12,684,066 B2
(45) Date of Patent: Jul. 14, 2026

(54) COMPUTER-BASED SYSTEMS CONFIGURED TO DYNAMICALLY REDUCE A PLURALITY OF SUBSEQUENT AUTHENTICATION STEPS REQUIRED TO EXECUTE SECURITY ACTION(S) AND METHODS OF USE THEREOF

(71) Applicant: Capital One Services, LLC, McLean, VA (US)

(72) Inventors: James Ashfield, Midlothian, VA (US); Clayton Johnson, Edgewood, MD (US); Daniel Alan Jarvis, Vienna, VA (US)

(73) Assignee: Capital One Services, LLC, McLean, VA (US)

(*) Notice: Subject to any disclaimer, the term of this patent is extended or adjusted under 35 U.S.C. 154(b) by 532 days.

(21) Appl. No.: 18/324,006

(22) Filed: May 25, 2023

(65) Prior Publication Data
US 2024/0396998 A1    Nov. 28, 2024

(51) Int. Cl.
*G06N 5/025* (2023.01)
*H04M 3/436* (2006.01)

(52) U.S. Cl.
CPC .......... *H04M 3/4365* (2013.01); *G06N 5/025* (2013.01)

(58) Field of Classification Search
CPC ........................... H04M 3/5183; H04M 3/4365
USPC ........................................................ 455/415
See application file for complete search history.

(56) References Cited

U.S. PATENT DOCUMENTS

| | | | |
|---|---|---|---|
| 8,438,394 B2 * | 5/2013 | Etchegoyen .......... | H04L 9/3263 726/10 |
| 8,832,798 B2 | 9/2014 | Thavasi et al. | |
| 9,443,073 B2 * | 9/2016 | Oberheide .......... | H04L 63/0876 |
| 9,871,779 B2 | 1/2018 | Sheller et al. | |
| 9,992,207 B2 | 6/2018 | Tartz et al. | |
| 2013/0067547 A1 * | 3/2013 | Thavasi ................... | G06F 21/32 726/7 |
| 2015/0242605 A1 * | 8/2015 | Du .......................... | G06F 21/32 726/7 |

* cited by examiner

*Primary Examiner* — Jirapon Tulop
(74) *Attorney, Agent, or Firm* — GREENBERG TRAURIG, LLP

(57) ABSTRACT

In some embodiments, the present disclosure provides an exemplary method that may include steps instructing a permission from the user to monitor a plurality of activities; instructing the mobile device to continually monitor the plurality of activities; identifying a digital fingerprint associated with the mobile device; automatically instructing an application of the mobile device to execute a plurality of operations in the background of the mobile device; utilizing a digital network to transmit a digital signal encoding the plurality of device attributes; utilizing a dynamic rules engine to determine a presence of the digital fingerprint within a database of known digital fingerprints; identifying an incoming interaction session being initiated with the mobile device within the period of time; automatically authenticating a parameter to identify an authenticated interaction session; and dynamically reducing subsequent authentication steps required for the mobile device to execute a activity.

20 Claims, 7 Drawing Sheets

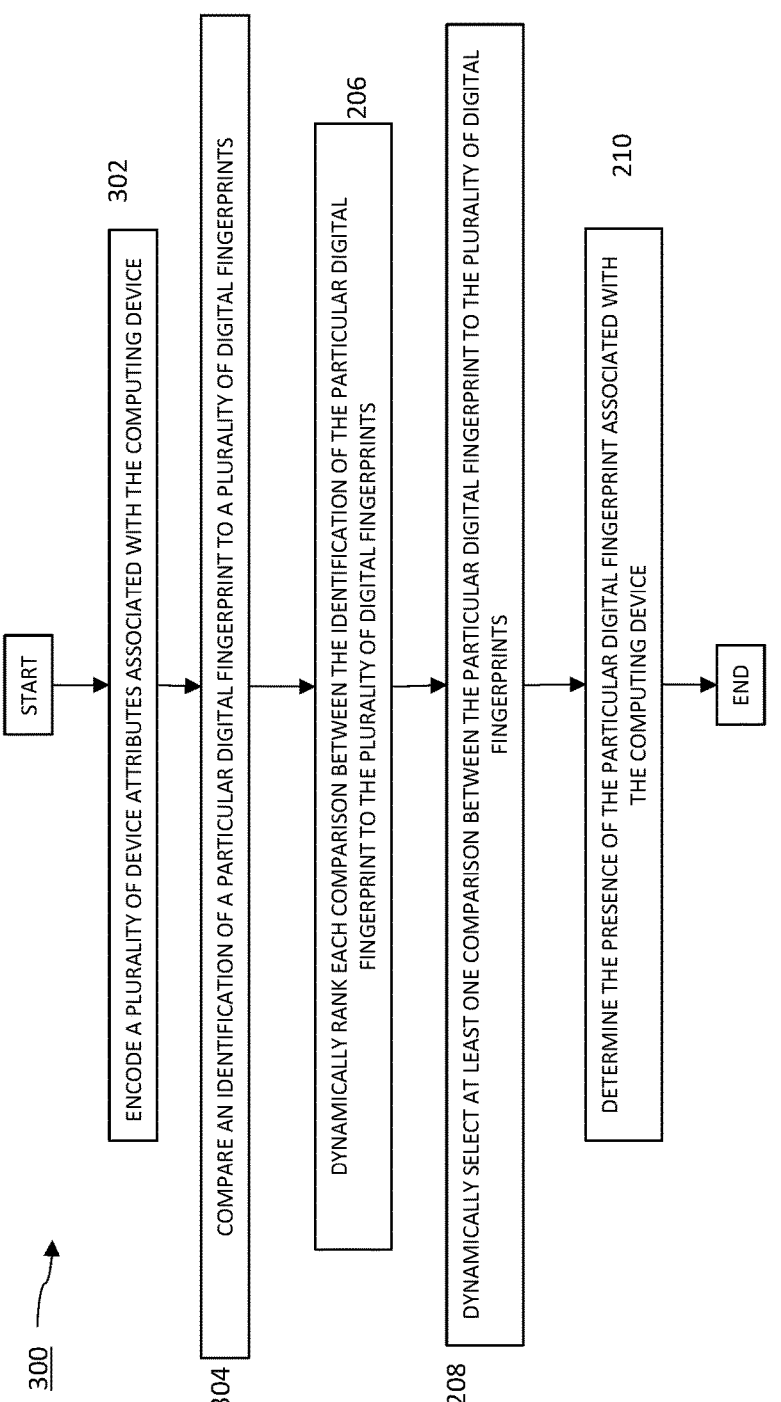

300

START

ENCODE A PLURALITY OF DEVICE ATTRIBUTES ASSOCIATED WITH THE COMPUTING DEVICE

302

304

COMPARE AN IDENTIFICATION OF A PARTICULAR DIGITAL FINGERPRINT TO A PLURALITY OF DIGITAL FINGERPRINTS

DYNAMICALLY RANK EACH COMPARISON BETWEEN THE IDENTIFICATION OF THE PARTICULAR DIGITAL FINGERPRINT TO THE PLURALITY OF DIGITAL FINGERPRINTS

206

208

DYNAMICALLY SELECT AT LEAST ONE COMPARISON BETWEEN THE PARTICULAR DIGITAL FINGERPRINT TO THE PLURALITY OF DIGITAL FINGERPRINTS

DETERMINE THE PRESENCE OF THE PARTICULAR DIGITAL FINGERPRINT ASSOCIATED WITH THE COMPUTING DEVICE

210

END

FIG. 3

COMPUTER-BASED SYSTEMS CONFIGURED TO DYNAMICALLY REDUCE A PLURALITY OF SUBSEQUENT AUTHENTICATION STEPS REQUIRED TO EXECUTE SECURITY ACTION(S) AND METHODS OF USE THEREOF

FIELD OF TECHNOLOGY

The present disclosure generally relates to computer-based systems configured to dynamically reduce a plurality of subsequent authentication steps required to execute an r security actions and methods of use thereof.

BACKGROUND OF TECHNOLOGY

Typically, spam is directed to large numbers of users for the purposes of advertising, phishing, or spreading malware. Usually, spam includes all forms of unwanted communications including, but not limited to unsolicited calls or messages, caller identification spoofing, and robocalls. The goal or purpose of a spam call is to sell some goods that might be unsolicited or unwanted.

SUMMARY OF DESCRIBED SUBJECT MATTER

In some embodiments, the present disclosure provides an exemplary technically improved computer-based method that includes at least the following steps: instructing, by at least one processor of a call center server, a mobile device associated with a user to obtain, via at least one graphical user interface (GUI) having at least one programmable GUI element, a permission from the user to monitor a plurality of calling-related activities executed within the mobile device; wherein the mobile device is a mobile phone; instructing, by the at least one processor of the call center server, the mobile device to continually monitor, in response to obtaining the permission from the user, the plurality of calling-related activities executed within the mobile device for a predetermined period of time, wherein at least one calling-related activity of the plurality of calling-related activities is determining a plurality of device attributes associate with the mobile device; identifying, by the at least one processor of the call center server, a digital fingerprint associated with the mobile device based on a determination of the plurality of device attributes within the predetermined period of time associated with the continual monitoring of the mobile device; automatically instructing, by the at least one processor of the call center server, an application of the mobile device to execute a plurality of operations in the background of the mobile device in response to an identification of a utilization of the digital fingerprint to log into the mobile device; automatically utilizing, by the at least one processor of the call center server, a digital network to transmit a digital signal encoding the plurality of device attributes to a computing device associated with at least one call center agent, wherein the digital signal is configured to detail the plurality of device attributes associated with the mobile device; automatically utilizing, by the at least one processor of the call center server, a dynamic rules engine to determine a presence of the digital fingerprint associated with the mobile device within a pre-generated database of known digital fingerprints stored in an external data source, wherein the dynamic rules engine is an artificial intelligence algorithm that compares at least one device fingerprint to a plurality of known device fingerprints stored on a server computing device, wherein the dynamic rules engine identifies metadata associated with the mobile device based on the digital fingerprint; identifying, by the at least one processor of the call center server, an incoming interaction session being initiated with the mobile device within the predetermined period of time subsequent to the determination of the presence of the digital fingerprint associated with mobile device within the pre-generated database of known digital fingerprints; utilizing, by the at least one processor of the call center server, a trained machine learning algorithm to dynamically determine a predetermined level of risk associated with the mobile device by calculating an overall confidence value based on an aggregation of a calculated confidence value associated with the user, a calculated confidence value associated with the mobile phone, and a calculated confidence value associated with the digital fingerprint; automatically authenticating, by the at least one processor of the call center server and in response to identifying the incoming interaction session being initiated with the mobile device, at least one session interaction parameter to identify the incoming interaction session as an authenticated interaction session based on the predetermined level of risk associated with the mobile device; and dynamically reducing, by the at least one processor of the call center server, a plurality of subsequent authentication steps required for the mobile device to execute at least one high-risk activity based on the overall confidence value associated with the mobile device meeting or exceeding a predetermined threshold of confidence.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 3 is a diagram illustrating a dynamic rules engine to determine a presence of the digital fingerprint associated with the mobile device within a pre-generated database of known digital fingerprints stored in an external data source, in accordance with one or more embodiments of the present disclosure.

DETAILED DESCRIPTION

Figure 1:
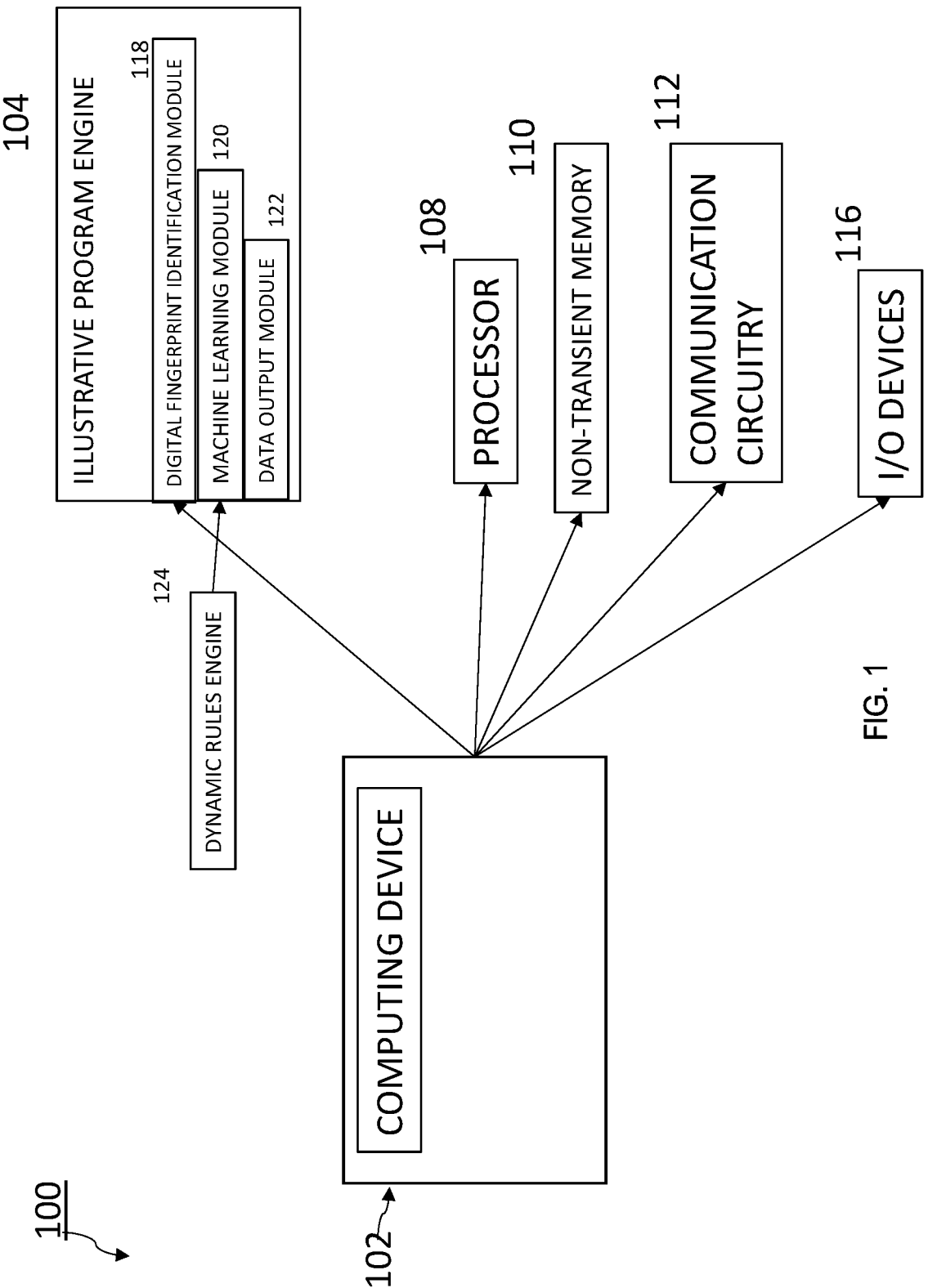
FIG. 1 depicts a block diagram of an exemplary computer-based system and platform for dynamically reducing a plurality of subsequent authentication steps required for the mobile device to execute at least one high-risk activity, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a creator interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

At least some embodiments of the present disclosure provide technological solution(s) to at least one technological computer-centered problem associated with authenticating a mobile device to execute at least one high-risk activity. An illustrative technological computer-centered problem associated with authenticating the mobile device may typically arise during an unsuspected incoming interaction and/or activity with the mobile device, either via a telephone call, text message, and/or email notification, which may increase likelihood that the sensitive, personal information associated with an individual associated with the mobile device may be extracted while the individual is executing the high-risk activity. For example, the sensitive, personal information associated with the individual may refer to social security numbers, bank account information, passwords associated with the individual, and application account information associated with the individual. The illustrative technological computer-centered problem may increase the risk of security breaches associated with an incoming interaction session. As detailed in at least some embodiments herein, one technological computer-centered solution associated with the technological computer-centered problem may be a dynamic generation of a digital fingerprint associated with a verified user for a predetermined period of time. In some embodiments, the present disclosure may utilize a digital network associated with a call center system to transmit a digital signal encoding the plurality of device attributes to a computing device and/or a server computing device. In another embodiment, the present disclosure may utilize a dynamic rules engine to identify metadata associated with the computing device. In some embodiments, the present disclosure may utilize a trained machine learning module to dynamically determine a level of risk threshold associated with an authenticated incoming interaction session parameter. In one embodiment, the trained machine learning module may refer to a machine learning algorithm trained using a supervised learning system for a predetermined period of time. In other embodiments, the trained machine learning module may refer to the machine learning algorithm trained using an unsupervised learning and/or a semi-supervised learning for the predetermined period of time. For example, the machine learning module may include at least one of regression algorithm, instance-based algorithm, regularization algorithm, decision tree algorithm, Bayesian algorithm, clustering algorithm, associated rule learning algorithm, deep learning algorithm, dimensionality reduction algorithm, ensemble algorithm, and/or artificial neural network algorithm. In another embodiment, the technological computer-centered solution associated with the technological computer-centered problem by dynamically reducing a plurality of subsequent authentication steps based on the dynamic generation of the digital fingerprint associated with the verified user for the predetermined period of time.

FIG. 1 depicts a block diagram of an exemplary computer-based system and platform for dynamically reducing a plurality of subsequent authentication steps based on a digital fingerprint associated with a mobile device and an authenticated session interaction parameter associated with the incoming interaction session.

In some embodiments, an illustrative computing system 100 of the present disclosure may include a computing device 102 associated with at least one user and an illustrative program engine 104. In some embodiments, the illustrative program engine 104 may be stored on the computing device 102. In some embodiments, the illustrative program engine 104 may be stored on the computing device 102, which may include a processor 108, a non-transient memory 110, a communication circuitry 112 for communicating over a communication network 114 (not shown), and input and/or output (I/O) devices 116 such as a keyboard, mouse, a touchscreen, and/or a display, for example. In some embodiments, the computing device 102 may refer to at least one calling-enabled computing device of a plurality of calling-enabled computing devices. For example, the computing device 102 is a mobile device, a smart phone, and/or a laptop. In some instances, the computing device 102 may be the at least one calling-enabled computing device with an ability to execute a plurality of activities. In some instances, at least one activity of the plurality of activities may refer to an ability to initiate an interaction session with an external computing device. In other embodiments, the at least one activity of the plurality of activities may operate discreetly during the execution of at least one other activity of the plurality of activities. For example, the at least one activity operates in the background of the computing device 102. In some embodiments, the server computing device 106 may refer to a call center server system.

In some embodiments, the illustrative program engine 104 may be configured to instruct the processor 108 to execute one or more software modules such as, without limitation, an exemplary digital fingerprint identification module 118, a machine learning module 120, and/or a data output module 122.

In some embodiments, an exemplary digital fingerprint identification module 118, of the present disclosure, utilizes at least one machine learning algorithm, described herein, to identify a digital fingerprint associated with the computing device 102 based on a determination of the plurality of device attributes within a predetermined period of time; determine a presence of the digital fingerprint associated with the mobile device within a pre-generated database of known digital fingerprints stored in an external data source; and automatically authenticate at least one session interaction parameter to identify the incoming interaction session as an authenticated interaction session based on the predetermined level of risk. In some embodiments, the exemplary digital fingerprint identification module 118 may instruct the computing device 102 associated with a user to obtain, via at least one graphical user interface (GUI) having at least one programmable GUI element, a permission from the user to monitor a plurality of calling-related activities executed within the computing device 102. In some embodiments, the exemplary digital fingerprint identification module 118 may instruct the computing device 102 to continually monitor the plurality of calling-related activities executed within the computing device 102 for a predetermined period of time in response to obtaining the permission from the user. In some embodiments, the exemplary digital fingerprint identification module 118 may identify the digital fingerprint associated with the computing device 102 based on a determination of the plurality of device attributes within the predetermined period of time associated with the continual monitoring of the computing device 102. For example, the plurality of device attributes may refer to performance specifications associated with the computing device 102. In another embodiment, the plurality of device attributes may refer to a plurality of user preferences associated with the user to determine an optimized performance of the computing device 102 based on the plurality of user preferences. In some embodiments, the exemplary digital fingerprint identification module 118 may automatically instruct an application of the computing device 102 to execute a plurality of operations in the background of the computing device 102 in response to an identification of a utilization of the digital fingerprint to access data within the computing device 102. In some embodiments, the exemplary digital fingerprint identification module 118 may automatically utilize a digital network to transmit a digital signal that encodes the plurality of device attributes to a different computing device associated with a call center server system. In some embodiments, the exemplary digital fingerprint identification module 118 may automatically utilize a dynamic rules engine 124 to determine a presence of the digital fingerprint associated with the computing device 102 within a pre-generated database of known digital fingerprints stored in the server computing device 106. For example, the exemplary digital fingerprint identification module 118 may determine the presence of the digital fingerprint based on an analysis of metadata associated with the digital signal, and the computing device 102, and based on this analysis of the metadata, determine the presence of a particular digital fingerprint associated with a particular user, such as an encrypted login and password. In some embodiments, the exemplary digital fingerprint identification module 118 may identify an incoming interaction session being initiated with the computing device 102 within the predetermined period of time subsequent to the determination of the presence of the digital fingerprint associated with computing device 102. In some embodiments, the exemplary digital fingerprint identification module 118 may utilize a trained machine learning algorithm to dynamically determine a level of risk threshold associated with the computing device 102. In some instances, the exemplary digital fingerprint identification module 118 may dynamically determine the level of risk threshold by calculating an overall confidence value based on an aggregation of a calculated confidence value associated with the user, a calculated confidence value associated with the computing device 102, and a calculated confidence value associated with the digital fingerprint. In some embodiments, the exemplary digital fingerprint identification module 118 may automatically authenticate at least one session interaction parameter to identify the incoming interaction session as an authenticated interaction session based on the level of risk threshold associated with the computing device 102. In some embodiments, the exemplary digital fingerprint identification module 118 may dynamically reduce a plurality of subsequent authentication steps required for the computing device 102 to execute at least one high-risk activity based on the overall confidence value associated with the computing device 102 meeting and/or exceeding a predetermined threshold of confidence.

In some embodiments, the present disclosure describes systems for utilizing the machine learning module 120 that may transmit the digital signal that encodes the plurality of device attributes to the different computing device associated with the call center server system. In some embodiments, the machine learning module 120 may determine a presence of the digital fingerprint associated with the computing device 102 within a pre-generated database of known digital fingerprints stored in the server computing device 106. For example, the exemplary digital fingerprint identification module 118 may determine the presence of the digital fingerprint based on an analysis of metadata associated with the digital signal, and the computing device 102, and based on this analysis of the metadata, determine the presence of a particular digital fingerprint associated with a particular user, such as an encrypted login and password. In some embodiments, the machine learning module 120 may be trained utilizing the dynamic rules engine 124 to determine the presence of the digital fingerprint associated with the computing device 102 via continually monitoring the computing device 102 for the predetermined period of time and automatically updating the machine learning module 120 at predetermined points of time. In one embodiment, the trained machine learning module may refer to a machine learning algorithm trained using a supervised learning system for a predetermined period of time. In other embodiments, the trained machine learning module may refer to the machine learning algorithm trained using an unsupervised learning and/or a semi-supervised learning for the predetermined period of time. For example, the machine learning module may include at least one of regression algorithm, instance-based algorithm, regularization algorithm, decision tree algorithm, Bayesian algorithm, clustering algorithm, associated rule learning algorithm, deep learning algorithm, dimensionality reduction algorithm, ensemble algorithm, and/or artificial neural network algorithm. In other embodiments, the training data may refer to telecommunication data received over a period of time in combination with updated telecommunication data stored in at least one external data source. In some embodiments, the machine learning module 120 may identify the incoming interaction session being initiated with the computing device 102 within the predetermined period of time subsequent to the determination of the presence of the digital fingerprint. In some embodiments, the machine learning module 120 may dynamically determine a predetermined level of risk associated with the computing device 102 by calculating an overall confidence value based on an aggregation of a calculated confidence value associated with the user, a calculated confidence value associated with the computing device 102, and a calculated confidence value associated with the digital fingerprint. In some embodiments, the machine learning module 120 may automatically authenticate at least one session interaction parameter to identify the incoming interaction session as an authenticated interaction session based on the predetermined level of risk associated with the computing device 102. For example, the session interaction parameter may be authenticated in response to the risk associated with the interaction session being assessed as a low risk, where a low risk receives a confidence score of three or lower on a scale of one to of five of risk. In some embodiments, the machine learning module 120 may dynamically reduce a plurality of subsequent authentication steps required for the computing device 102 to execute at least one high-risk activity based on the overall confidence value associated with the computing device 102 meeting and/or exceeding a predetermined threshold of confidence.

In some embodiments, the data output module 122 may encode the determined plurality of device attributes associated with an identified digital fingerprint of the computing device 102 so that the encoded plurality of device attributes may be transmitted via the digital network to a different computing device associated with the call center server system. In some embodiments, the data output module 122 may determine the presence of the digital fingerprint associated with the computing device 102 within a pre-generated database of known digital fingerprints stored in the server computing device 106. In some embodiments, the data output module 122 may identify the incoming interaction session being initiated with the computing device 102 within the predetermined period of time subsequent to the determination of the presence of the digital fingerprint. In some embodiments, the data output module 122 may transmit a digital signal encoding a plurality of device attributes to a computing device associated with a call center agent. In some embodiments, the data output module 122 may generate a database of known digital fingerprints stored in the server computing device 106. In some embodiments, the data output module 122 may dynamically determine a predetermined level of risk associated with the mobile device by calculating an overall confidence value based on an aggregation of a calculated confidence value associated with the user, a calculated confidence value associated with the mobile phone, and a calculated confidence value associated with the digital fingerprint. In some embodiments, the data output module 122 may identify the incoming interaction session as an authenticated interaction session based on the predetermined level of risk associated with the mobile device. In some embodiments, the data output module 122 may dynamically reduce a plurality of subsequent authentication steps required for the mobile device to execute at least one high-risk activity based on the overall confidence value associated with the mobile device meeting or exceeding a predetermined threshold of confidence.

In some embodiments, the illustrative program engine 104 may instruct a mobile device associated with a user to obtain a permission from the user to monitor a plurality of calling-related activities executed within the mobile device. In some embodiments, the illustrative program engine 104 may instruct the mobile device to continually monitor the plurality of calling-related activities executed within the mobile device for a predetermined period of time. In some embodiments, the illustrative program engine 104 may identify a digital fingerprint associated with the mobile device based on a determination of the plurality of device attributes withing the predetermined period of time associated with the continual monitoring of the mobile device. In some embodiments, the illustrative program engine 104 may automatically instruct an application of the mobile device to execute a plurality of operations in the background of the mobile device in response to an identification of a utilization of the digital fingerprint to log into the mobile device. In some embodiments, the illustrative program engine 104 may automatically utilize a digital network to transmit a digital signal encoding the plurality of device attributes to a computing device associated with at least one call center agent. In some embodiments, the illustrative program engine 104 may automatically utilize the dynamic rules engine 124 to determine the present of the digital fingerprint associated with the mobile device within a pre-generated database of known digital fingerprints stored within the server computing device 106 and/or an external data source. In some embodiments, the illustrative program engine 104 may identify an incoming interaction session being initiated with the mobile device within the predetermined period of time subsequent to the determination of the presence of the digital fingerprint associated with mobile device within the pre-generated database of known digital fingerprints. In some embodiments, the illustrative program engine 104 may dynamically determine a predetermined level of risk associated with the mobile device by calculating an overall confidence value based on an aggregation of a calculated confidence value associated with the user, a calculated confidence value associated with the mobile phone, and a calculated confidence value associated with the digital fingerprint. In some embodiments, the illustrative program engine 104 may automatically authenticate at least one session interaction parameter to identify the incoming interaction session as an authenticated interaction session based on the predetermined level of risk associated with the mobile device. In some embodiments, the illustrative program engine 104 may dynamically reduce a plurality of subsequent authentication steps required for the mobile device to execute at least one high-risk activity based on the overall confidence value associated with the mobile device meeting or exceeding a predetermined threshold of confidence. In another embodiment, the illustrative program engine 104 may dynamically increase the plurality of subsequent authentication steps required for the mobile device to execute the at least one high-risk activity based on the overall confidence value associated with the mobile device meeting or exceeding the predetermined threshold of confidence.

In some embodiments, the non-transient memory 110 may store the plurality of device attributes associated with the continual monitoring of the mobile device. In some embodiments, the non-transient memory 110 may store the plurality of operations to execute within the background of the computing device 102. In some embodiments, the non-transient memory 110 may store an encoded digital signal associated with the plurality of device attributes for the computing device 102. In some embodiments, the non-transient memory 110 may store a pre-generated database of known digital fingerprints to identify an incoming interaction session. In some embodiments, the non-transient memory 110 may store a predetermined level of risk associated with the mobile device by calculating an overall confidence value based on an aggregation of a calculated confidence value associated with the user, a calculated confidence value associated with the mobile phone, and a calculated confidence value associated with the digital fingerprint.

Figure 2:
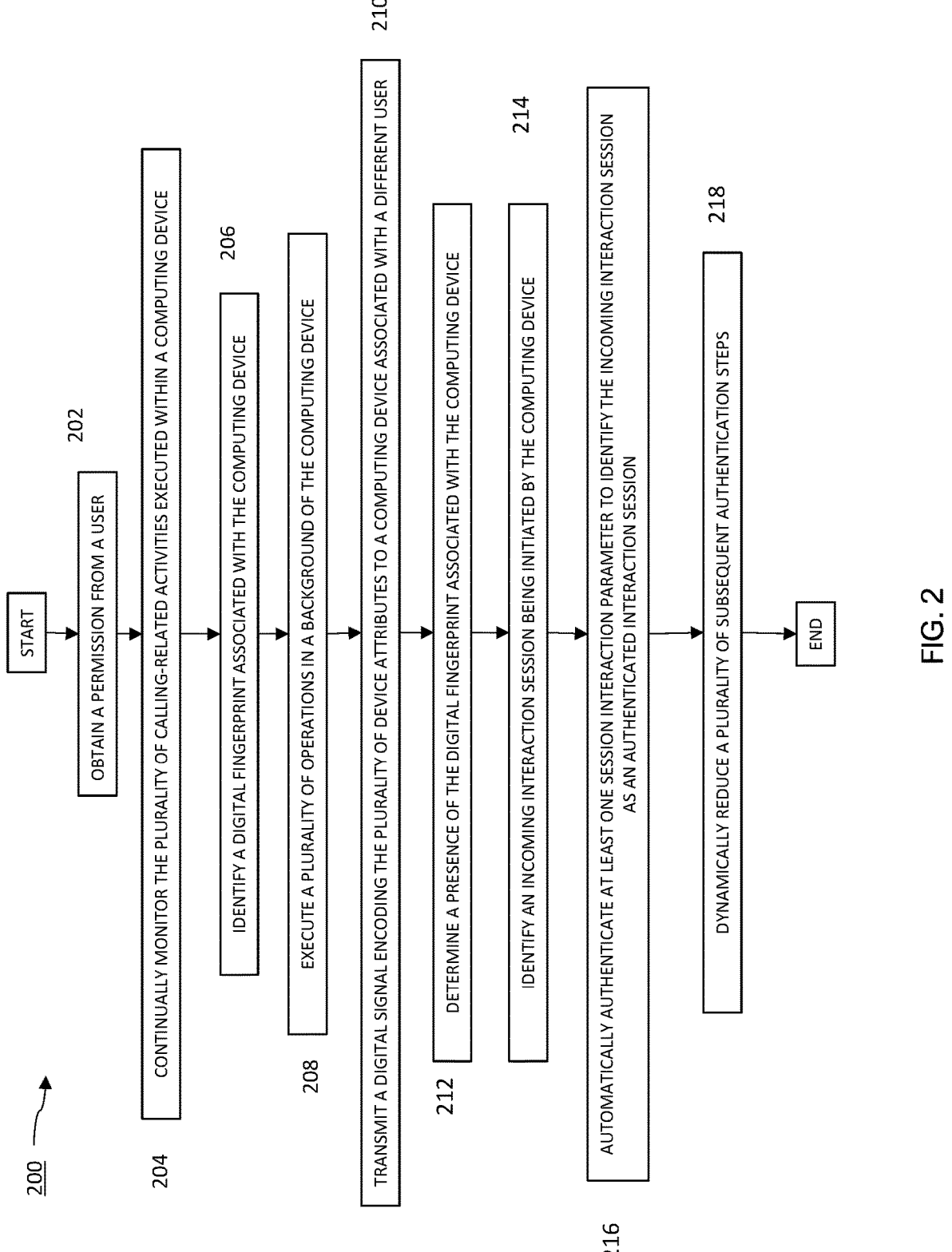
FIG. 2 is a flowchart illustrating operational steps for dynamically reducing a plurality of subsequent authentication steps required for the mobile device to execute at least one high-risk activity, in accordance with one or more embodiments of the present disclosure.

FIG. 2 is a flowchart 200 illustrating operational steps for dynamically reducing a plurality of subsequent authentication steps required for the mobile device to execute at least one high-risk activity, in accordance with one or more embodiments of the present disclosure.

In step 202, the illustrative program engine 104 within the computing device 102 may be programmed to obtain a permission from a user. In some embodiments, the illustrative program engine 104 may instruct the computing device 102 to obtain the permission for the user to monitor a plurality of calling-related activities executed with the computing device 102. In some embodiments, the computing device 102 may refer to a mobile device capable of the plurality of calling-related activities. In other embodiments, the mobile device may refer to a smart phone. In some embodiments, the illustrative program engine 104 may obtain the permission from the user via at least one graphical user interface ("GUI") having at least one programmable GUI element.

In step 204, the illustrative program engine 104 may continually monitor the plurality of calling-related activities within the computing device 102. In some embodiments, the illustrative program engine 104 may instruct the computing device 102 to continually monitor the plurality of calling-related activities with a predetermined period of time in response to obtaining the permission from the user. In some embodiments, the exemplary digital fingerprint identification module 118 may instruct the computing device 102 to continually monitor the plurality of calling-related activities with the predetermined period of time in response to obtaining the permission from the user.

In step 206, the illustrative program engine 104 may identify a digital fingerprint associated with the computing device 102. In some embodiments, the illustrative program engine 104 may identify the digital fingerprint associated with the computing device 102 based on a determination of a plurality of device attributes within the predetermined period of time associated with the continual monitoring. In some embodiments, the exemplary digital fingerprint identification module 118 may identify the digital fingerprint associated with the computing device 102 based on the determination of the plurality of device attributes within the predetermined period of time associated with the continual monitoring of the mobile device. In some embodiments, the plurality of device attributes may refer to additional information associated with the computing device 102 of a particular user, where the additional information may refer to specifications associated with the mobile device of the particular user. In some embodiments, the digital fingerprint may refer to a unique personal identification associated with the particular user of a plurality of users. In another embodiment, the digital fingerprint may refer to an additional method of identification associated with the particular user and may be utilized to log into the computing device 102.

In step 208, the illustrative program engine 104 may execute a plurality of operations in the background of the computing device 102. In some embodiments, the illustrative program engine 104 may automatically execute the plurality of operations in the background of the computing device 102 in response to an identification of a utilization of the digital fingerprint to log into the computing device 102. In some embodiments, the plurality of operations may refer to a plurality of remedial actions (e.g., security actions) that may be performed simultaneously or sequentially with the illustrative program engine 104 utilizing the digital fingerprint to log into the mobile device. In some embodiments, the plurality of security actions may refer to a plurality of actions to verify the identity of the user associated with the computing device 102. In some embodiments, the exemplary digital fingerprint identification module 118 may automatically instruct an application of the mobile device to execute the plurality of operations in the background of the mobile device in response to the identification of the utilization of the digital fingerprint to log into the mobile device.

In step 210, the illustrative program engine 104 may transmit a digital signal encoding the plurality of device attributes to a computing device associated with a different user. In some embodiments, the illustrative program engine 104 transmit the digital signal encoding the plurality of device attributes to a computing device associated with at least one call center agent. In some embodiments, the digital signal may refer to a uniformly transmittable translation of the plurality of device attributes in a standardized data language. In some embodiments, the exemplary digital fingerprint identification module 118 may utilize a digital network to transmit the digital signal encoding the plurality of device attributes to a computing device associated with at least one call center agent. In some embodiments, the digital network may refer to a set of communication standard for simultaneous digital transmission of voice, video, and email data.

In step 212, the illustrative program engine 104 may determine a presence of the digital fingerprint associated with computing device 102. In some embodiments, the illustrative program engine 104 may determine the presence of the digital fingerprint associated with computing device 102 by analyzing a pre-generated database of known digital fingerprints stored in the server computing device 106. In some embodiments, the analysis of the pre-generated database of known fingerprints may refer to comparing the identification of the digital fingerprint to each digital fingerprint in the plurality of digital fingerprints stored with the pre-generated database of known fingerprints; ranking each match between the identification of the digital fingerprint to each digital fingerprint of the plurality of fingerprints within the pre-generated database of known fingerprints based on metadata statistics associated with each digital fingerprint; and selecting the match with a highest rankings as a positive match between the plurality of fingerprints within the pre-generated database of known fingerprints based on the metadata statistics associated with each digital fingerprint. In some embodiments, the exemplary digital fingerprint identification module 118 may utilize a dynamic rules engine 124 to determine the presence of the digital finger-print associated with the mobile device within a pre-gener-ated database of known digital fingerprints stored in an external data source. In some embodiments, the dynamic rules engine 124 may refer to an artificial intelligence algorithm that analyzes the server computing device 106 for a positive match to the identification of the digital fingerprint associated with the computing device 102. In some embodi-ments, the exemplary digital fingerprint identification mod-ule 118 may utilize the dynamic rules engine 124 to identify metadata associated with the computing device 102 based on the identified digital fingerprint.

In step 214, the illustrative program engine 104 may identify an incoming interaction session being initiated by the computing device 102. In some embodiments, the illus-trative program engine 104 may identify the incoming interaction session being initiated by the computing device 102 within the predetermine period of time associated with the monitoring of the computing device 102. In some embodiments, the illustrative program engine 104 may identify the incoming interaction session being initiated by the computing device 102 in response to determining the presence of the digital fingerprint associated with the com-puting device 102 within the pre-generated database of digital fingerprints. In some embodiments, the incoming interaction session being initiated by the computing device 102 may refer to an outgoing call, outgoing messages, and outgoing notifications. In some embodiments, the exemplary digital fingerprint identification module 118 may identify the incoming interaction session being initiated by the comput-ing device 102 within the predetermine period of time associated with the monitoring of the computing device 102 in response to determining the presence of the digital fingerprint associated with the computing device 102 within the pre-generated database of digital fingerprints.

In some embodiments, the illustrative program engine 104 may utilize the machine learning module 120 to dynamically determine a level of risk associated with the computing device 102. In some embodiments, the illustra-tive program engine 104 may utilize the machine learning module 120 to dynamically determine the level of risk associated with the computing device 102 by calculating an overall confidence value based on an aggregation of a calculated confidence value associated with the user, a calculated confidence value associated with the mobile phone, and a calculated confidence value associated with the digital fingerprint. In some embodiments, the determined level of risk may refer to a risk threshold that, when reached, may result in a security breach of personal information associated with the user of the computing device 102.

In step 216, the illustrative program engine 104 may automatically authenticate at least one session interaction parameter to identify the incoming interaction session as an authenticated interaction session. In some embodiments, the illustrative program engine 104 may automatically authen-ticate the at least one session interaction parameter to identify the incoming interaction session as the authenti-cated interaction session. In some embodiments, the authen-ticated interaction session may refer to an outgoing going between two authenticated computing devices based on the digital fingerprint associated with each computing device. In some embodiments, the session interaction parameter may refer to a session interaction protocol certificate. In another embodiment, the session interaction parameter may refer to STIR/SHAKEN protocol certificate, which is a suite of protocols and procedures intended to combat caller identi-fication spoofing on public telephone networks. In some embodiments, the exemplary digital fingerprint identifica-tion module 118 may automatically authenticate automati-cally authenticate the at least one session interaction param-eter to identify the incoming interaction session as the authenticated interaction session in response to identifying the incoming interaction session being initiated with the mobile device.

In step 218, the illustrative program engine 104 may dynamically reduce a plurality of subsequent authentication steps. In some embodiments, illustrative program engine 104 may dynamically reduce the plurality of subsequent authentication steps required for the computing device 102 to execute at least one high risk activity based on an overall confidence value associated with the computing device 102 meeting and/or exceeding a predetermined threshold of confidence. In some embodiments, the plurality of subse-quent authentication steps may refer to the steps an entity takes to authenticate an identity associated with an account to allow transactions to be performed with the account. In some embodiments, the overall confidence value may refer to a calculated score assessed to a prediction that the activity is between at least two authenticated computing devices based on the digital fingerprint, the at least one session interaction parameter, and a type of activity associated with the at least one high risk activity. In some embodiments, the at least one high risk activity may refer to an activity that may exceed an amount threshold of ordinary transactions, an activity occurring at a suspicious time of the day, and an activity attempting to be transmitted to a computing device associated with a suspicious digital fingerprint. In some embodiments, the exemplary digital fingerprint identifica-tion module 118 may dynamically reduce the plurality of subsequent authentication steps required for the computing device 102 to execute the at least one high risk activity based on the utilization of the dynamic rules engine 124 and the machine learning module 120. In another embodiment, the exemplary digital fingerprint identification module 118 may dynamically increase the plurality of subsequent authenti-cation steps required for the mobile device to execute the at least one high-risk activity based on the overall confidence value associated with the mobile device meeting and/or exceeding the predetermined threshold of confidence.

FIG. 3 is a flowchart 300 illustrating operational steps for dynamically determining a presence of the digital fingerprint associated with the mobile device within a pre-generated database of known digital fingerprints stored in an external data source, in accordance with one or more embodiments of the present disclosure.

In step 302, the illustrative program engine 104 may encode a plurality of device attributes associated with the computing device 102. In some embodiments, may encode the plurality of device attributes associated with the com-puting device 102 to transmit the to a computing device associated with a different user via a digital signal. In some embodiments, the illustrative program engine 104 may encode the plurality of device attributes associated with the computing device 102 by generating a uniformly transmit-table translation of the plurality of device attributes in a standardized data language, where the generated translation may refer to an encoded digital signal. In some embodiments, the exemplary digital fingerprint identification module 118 may encode the plurality of device attributes associated with the computing device 102 to a mobile device associated with a call center agent via a digital signal.

In step 304, the illustrative program engine 104 may compare an identification of a particular digital fingerprint to a plurality of digital fingerprints. In some embodiments, the illustrative program engine 104 may utilize the encoded digital signal to compare an identification of the particular digital fingerprint to the plurality of digital fingerprints within a database of known digital fingerprints based on the plurality of device attributes associated with each digital fingerprint. In some embodiments, the exemplary digital fingerprint identification module 118 may utilize the encoded digital signal to compare the identification of the particular digital fingerprint to the plurality of digital fingerprints within the database of known digital fingerprints based on the plurality of device attributes associated with each digital fingerprint. In some embodiments, the exemplary digital fingerprint identification module 118 may utilize the dynamic rules engine 124 to compare the identification of the particular digital fingerprint to the plurality of digital fingerprints within the database of known digital fingerprints based on the encoded digital signal.

In step 306, the illustrative program engine 104 may dynamically rank each comparison between the identification of the particular digital fingerprint to the plurality of digital fingerprints. In some embodiments, the illustrative program engine 104 may dynamically rank each comparison between the particular digital fingerprint to the plurality of digital fingerprints by assigning a value for each matching data point associated with the metadata statistics of each digital fingerprint in the plurality of fingerprints. In some embodiments, the exemplary digital fingerprint identification module 118 may dynamically rank each comparison between the particular digital fingerprint to the plurality of digital fingerprints. In some embodiments, the exemplary digital fingerprint identification module 118 may utilize the dynamic rules engine 124 to dynamically rank each comparison between the particular digital fingerprint to the plurality of digital fingerprints based on the metadata statistics associated with each digital fingerprint. For example, the dynamic rules engine 124 may generate ranking rules associated with each metadata statistic of a plurality of metadata statistic to assist in a dynamic ranking of a plurality of comparison between the plurality of digital fingerprints and a repository of telecommunication data.

In step 308, the illustrative program engine 104 may dynamically select at least one comparison between the particular digital fingerprint to the plurality of digital fingerprints. In some embodiments, the illustrative program engine 104 may dynamically select the at least one comparison between the particular digital fingerprint to the plurality of digital fingerprints based on the ranking of metadata statistics associated with each digital fingerprint. In some embodiments, the exemplary digital fingerprint identification module 118 may dynamically select the at least one comparison between the particular digital fingerprint to the plurality of digital fingerprints based on the ranking of metadata statistics associated with each digital fingerprint. In some embodiments, the exemplary digital fingerprint identification module 118 may utilize the dynamic rules engine 124 to dynamically select the at least one comparison between the particular digital fingerprint to the plurality of digital fingerprints.

In step 310, the illustrative program engine 104 may determine the presence of the particular digital fingerprint associated with computing device 102. In some embodiments, the illustrative program engine 104 may determine the presence of the digital fingerprint associated with computing device 102 based on the dynamic selection of the comparison between the particular digital fingerprint, which was based on the ranking of the metadata statistics associated with each digital fingerprint. In some embodiments, the exemplary digital fingerprint identification module 118 may determine the presence of the digital fingerprint associated with computing device 102 based on the dynamic selection of the comparison between the particular digital fingerprint. In some embodiments, the exemplary digital fingerprint identification module 118 may utilize the dynamic rules engine 124 to determine the presence of the digital fingerprint associated with computing device 102 based on the dynamic selection of the selection associated with the particular digital fingerprint.

Figure 4:
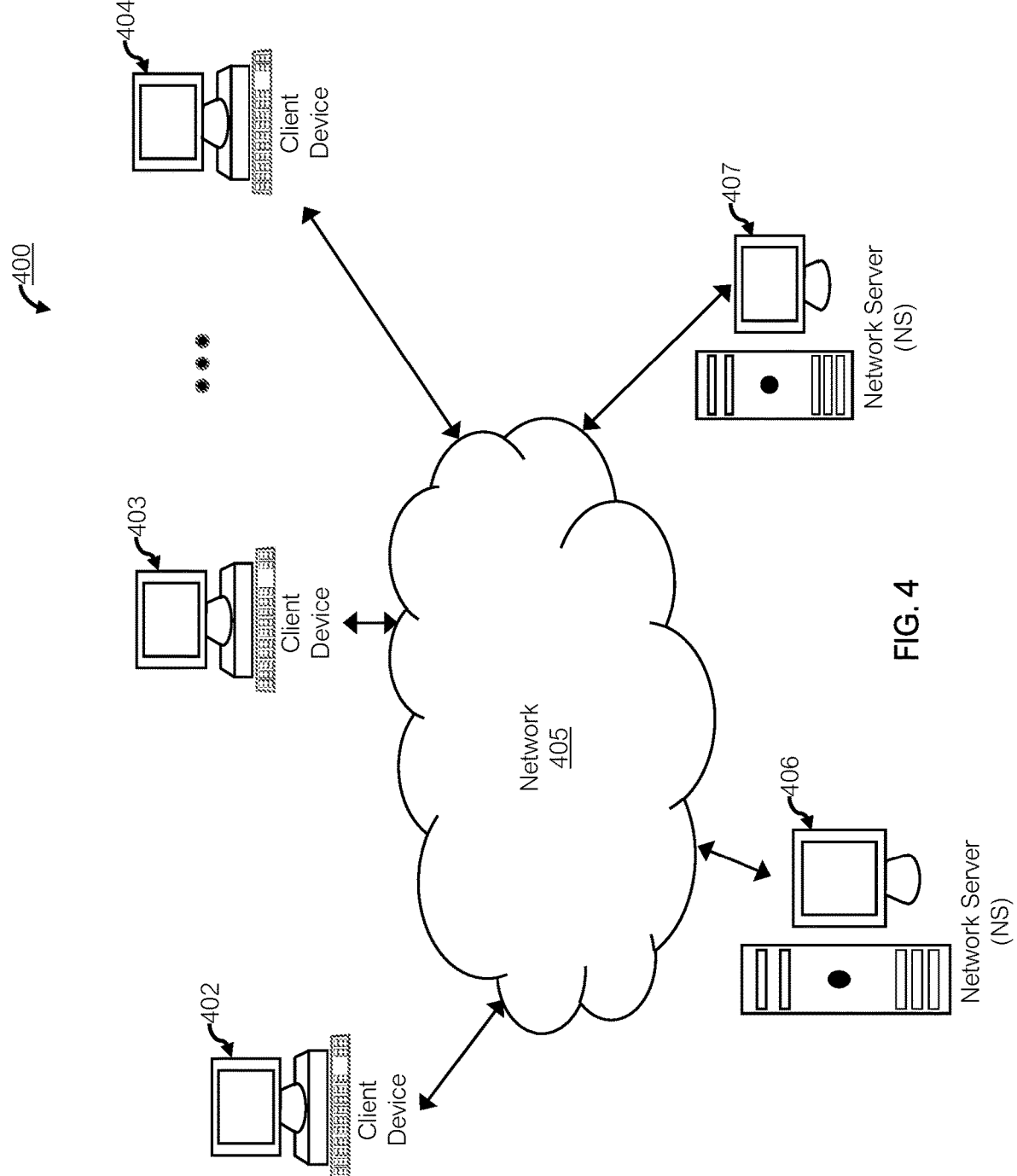
FIG. 4 depicts a block diagram of exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to dynamically determine the presence of a digital fingerprint associated with a computing device 102 and dynamically reduce a plurality of subsequent authentication steps associated with an activity in response to determining the presence of the digital fingerprint, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to manage the exemplary digital fingerprint identification module 118 of the present disclosure, utilizing at least one machine-learning model described herein.

In some embodiments, referring to FIG. 4, members 402-404 (e.g., clients) of the exemplary computer-based system/platform 400 may include virtually any computing device capable of automatically updating, dynamically removing, and automatically restoring a plurality of data records within a generated database of known queries via a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may launch one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary digital fingerprint identification module 118 of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/ or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to calculate a overall confidence value and modify the plurality of subsequent authentication steps to execute a computing device based on the determination of the presence of the digital fingerprint by the exemplary digital fingerprint identification module 118.

Figure 5:
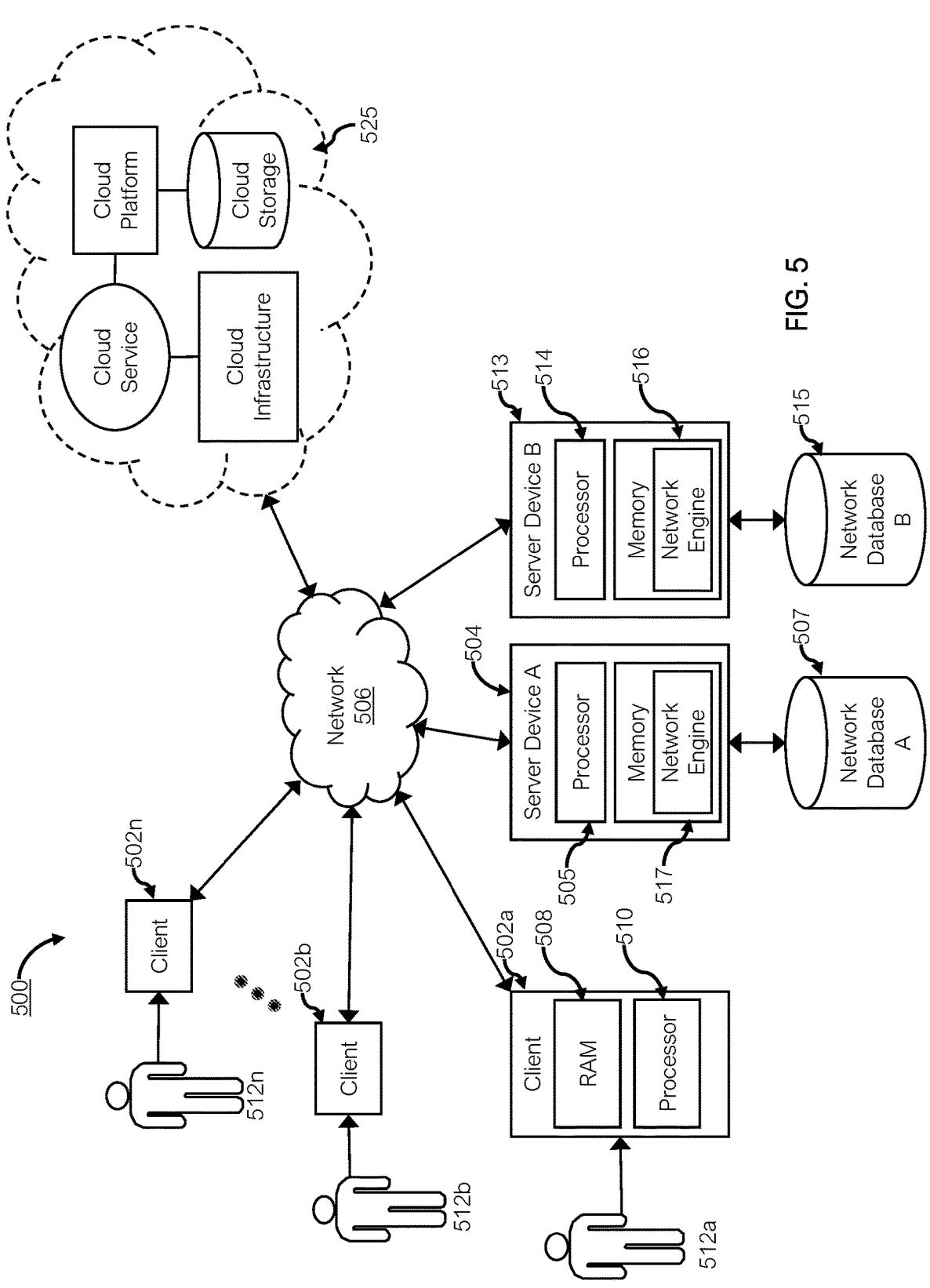
FIG. 5 depicts a block diagram of another exemplary computer-based system/platform in accordance with one or more embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502a through 502n may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
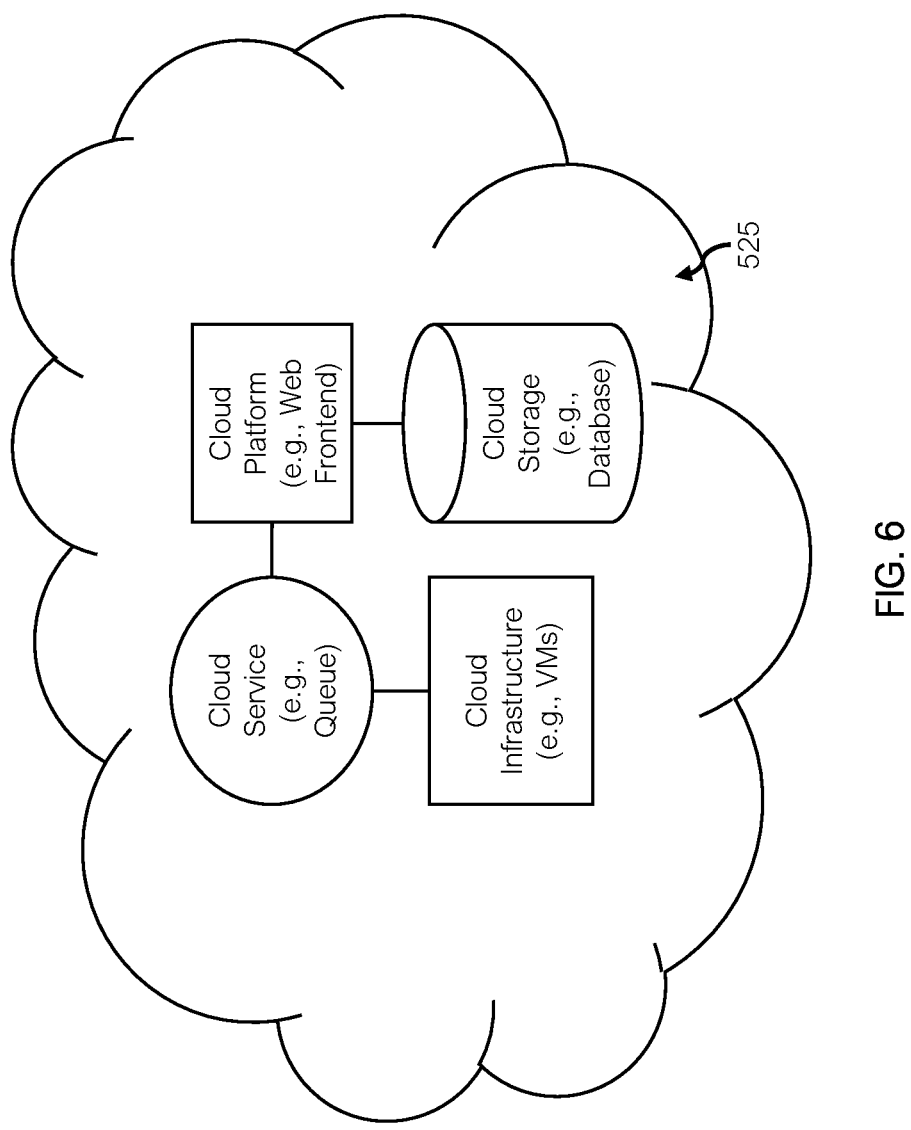
FIGS. 6 and 7 are diagrams illustrating implementations of cloud computing architecture/aspects with respect to which the disclosed technology may be specifically configured to operate, in accordance with one or more embodiments of the present disclosure.
Figure 7:
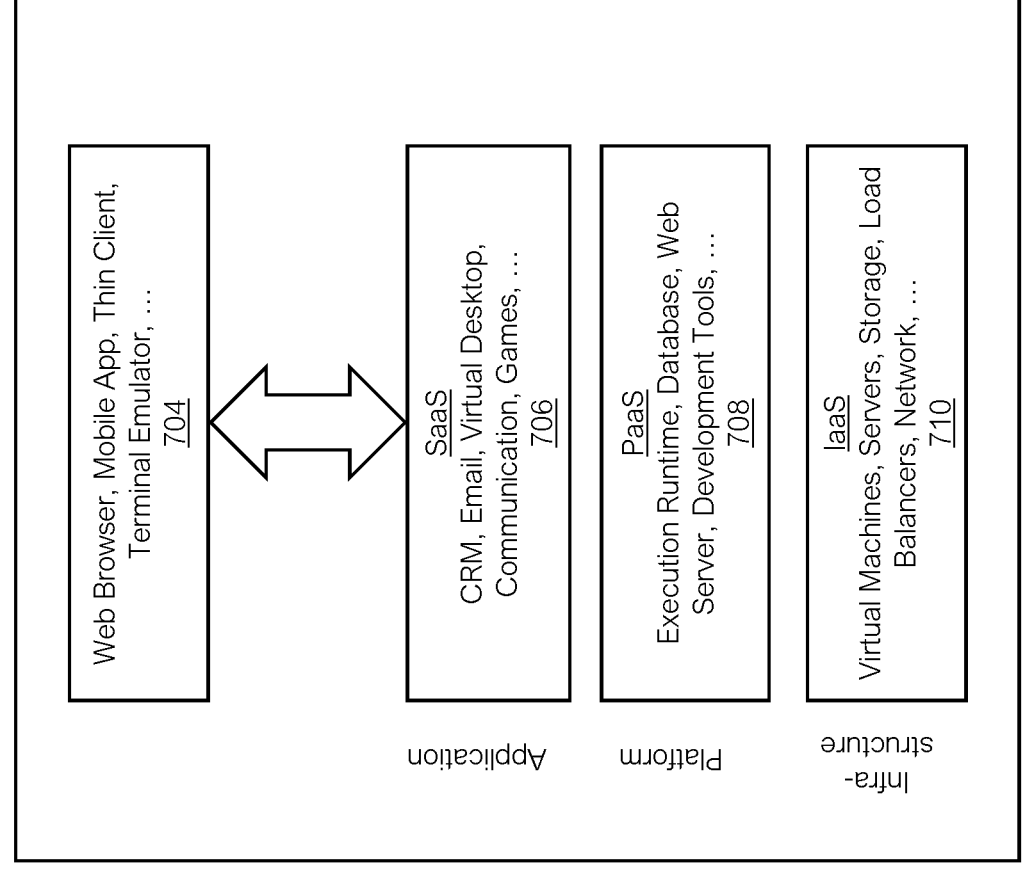

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS) 710, platform as a service (PaaS) 708, and/or software as a service (SaaS) 706.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile;™ (20) Microsoft DirectX™; (21).NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary ASR system of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

The aforementioned examples are, of course, illustrative and not restrictive.

At least some aspects of the present disclosure will now be described with reference to the following numbered clauses.

Clause 1. A method may include: instructing, by at least one processor of a call center server, a mobile device associated with a user to obtain, via at least one graphical user interface (GUI) having at least one programmable GUI element, a permission from the user to monitor a plurality of calling-related activities executed within the mobile device;

instructing, by the at least one processor of the call center server, the mobile device to continually monitor, in response to obtaining the permission from the user, the plurality of calling-related activities executed within the mobile device for a predetermined period of time; identifying, by the at least one processor of the call center server, a digital fingerprint associated with the mobile device based on a determination of a plurality of device attributes within the predetermined period of time associated with the continual monitoring of the mobile device; automatically instructing, by the at least one processor of the call center server, an application of the mobile device to execute a plurality of operations in a background of the mobile device in response to an identification of a utilization of the digital fingerprint to access the mobile device; utilizing, by the at least one processor of the call center server, a digital network to transmit a digital signal encoding the plurality of device attributes to a computing device associated with at least one call center agent, where the digital signal is configured to provide a uniformed translation of the plurality of device attributes associated with the mobile device; utilizing, by the at least one processor of the call center server, a dynamic rules engine to determine a presence of the digital fingerprint associated with the mobile device within a pre-generated database of known digital fingerprints stored in an external data source; identifying, by the at least one processor of the call center server, an incoming interaction session being initiated with the mobile device within the predetermined period of time subsequent to the determination of the presence of the digital fingerprint associated with mobile device within the pre-generated database of known digital fingerprints; automatically authenticating, by the at least one processor of the call center server and in response to identifying the incoming interaction session being initiated with the mobile device, at least one session interaction parameter to identify the incoming interaction session as an authenticated interaction session based on a predetermined threshold of confidence associated with the mobile device; and dynamically reducing, by the at least one processor of the call center server, a plurality of subsequent authentication steps required for the mobile device to execute at least one high-risk activity based on an overall confidence value associated with the mobile device meeting or exceeding the predetermined threshold of confidence.

Clause 2. The method according to clause 1, where the mobile device is a mobile phone.

Clause 3. The method according to clause 1 or 2, at least one calling-related activity of the plurality of calling-related activities includes determining a plurality of device attributes associate with the mobile device.

Clause 4. The method according to clause 1, 2 or 3, where the digital fingerprint associated with the mobile device includes a unique personal identification number associated with a particular user of the plurality of users.

Clause 5. The method according to clause 1, 2, 3 or 4, where the plurality of device attributes includes additional information associated with the mobile device associated with a particular user.

Clause 6. The method according to clause 1, 2, 3, 4 or 5, where the dynamic rules engine includes an artificial intelligence algorithm that compares at least one device fingerprint to a plurality of known device fingerprints stored on a server computing device.

Clause 7. The method according to clause 1, 2, 3, 4, 5 or 6, where the dynamic rules engine identifies metadata associated with the mobile device based on the digital fingerprint.

Clause 8. The method according to clause 1, 2, 3, 4, 5, 6 or 7, further including utilizing a trained machine learning algorithm to dynamically determine a predetermined level of risk associated with the mobile device by calculating an overall confidence value based on an aggregation of a calculated confidence value associated with the user, a calculated confidence value associated with the mobile device, and a calculated confidence value associated with the digital fingerprint.

Clause 9. The method according to clause 1, 2, 3, 4, 5, 6, 7 or 8, further including dynamically increasing the plurality of subsequent authentication steps required for the mobile device to execute the at least one high-risk activity based on the overall confidence value associated with the mobile device meeting or exceeding the predetermined threshold of confidence.

Clause 10. A method may include: instructing, by at least one processor of a call center server, a mobile device associated with a user to obtain, via at least one graphical user interface (GUI) having at least one programmable GUI element, a permission from the user to monitor a plurality of calling-related activities executed within the mobile device; instructing, by the at least one processor of the call center server, the mobile device to continually monitor, in response to obtaining the permission from the user, the plurality of calling-related activities executed within the mobile device for a predetermined period of time; identifying, by the at least one processor of the call center server, a digital fingerprint associated with the mobile device based on a determination of a plurality of device attributes within the predetermined period of time associated with the continual monitoring of the mobile device; automatically instructing, by the at least one processor of the call center server, an application of the mobile device to execute a plurality of operations in a background of the mobile device in response to an identification of a utilization of the digital fingerprint to access the mobile device; utilizing, by the at least one processor of the call center server, a digital network to transmit a digital signal encoding the plurality of device attributes to a computing device associated with at least one call center agent, where the digital signal is configured to provide a uniformed translation of the plurality of device attributes associated with the mobile device; utilizing, by the at least one processor of the call center server, a dynamic rules engine to determine a presence of the digital fingerprint associated with the mobile device within a pre-generated database of known digital fingerprints stored in an external data source; utilizing, by the at least one processor of the call center server, a trained machine learning algorithm to dynamically determine a predetermined level of risk associated with the mobile device by calculating an overall confidence value based on an aggregation of a calculated confidence value associated with the user, a calculated confidence value associated with the mobile phone, and a calculated confidence value associated with the digital fingerprint; identifying, by the at least one processor of the call center server, an incoming interaction session being initiated with the mobile device within the predetermined period of time subsequent to the determination of the presence of the digital fingerprint associated with mobile device within the pre-generated database of known digital fingerprints; automatically authenticating, by the at least one processor of the call center server and in response to identifying the incoming interaction session being initiated with the mobile device, at least one session interaction parameter to identify the incoming interaction session as an authenticated interaction session based on a predetermined threshold of con-fidence associated with the mobile device and the predetermined level of risk associated with the overall confidence value; and dynamically increasing, by the at least one processor of the call center server, a plurality of subsequent authentication steps required for the mobile device to execute at least one high-risk activity based on an overall confidence value associated with the mobile device meeting or exceeding the predetermined threshold of confidence. and the predetermined level of risk associated with the overall confidence value.

Clause 11. The method according to clause 10, where the mobile device is a mobile phone Clause 12. The method according to clause 10 or 11, at least one calling-related activity of the plurality of calling-related activities includes determining a plurality of device attributes associate with the mobile device.

Clause 13. The method according to clause 10, 11 or 12, where the digital fingerprint associated with the mobile device includes a unique personal identification number associated with a particular user of the plurality of users.

Clause 14. The method according to clause 10, 11, 12 or 13, where the plurality of device attributes includes additional information associated with the mobile device associated with a particular user.

Clause 15. The method according to clause 10, 11, 12, 13 or 14, where the dynamic rules engine includes an artificial intelligence algorithm that compares at least one device fingerprint to a plurality of known device fingerprints stored on a server computing device.

Clause 16. The method according to clause 10, 11, 12, 13, 14 or 15, where the dynamic rules engine identifies metadata associated with the mobile device based on the digital fingerprint.

Clause 17. The method according to clause 10, 11, 12, 13, 14, 15 or 16, where the utilizing the training machine learning algorithm to dynamically determine the predetermined level of risk associated with the mobile device includes calculating an overall confidence value based on an aggregation of a calculated confidence value associated with the user, a calculated confidence value associated with the mobile device, and a calculated confidence value associated with the digital fingerprint.

Clause 18. A system may include: a non-transient computer memory, storing software instructions; at least one processor of a first computing device associated with a user; where, when the at least one processor executes the software instructions, the first computing device is programmed to: instruct, by at least one processor of a call center server, a mobile device associated with a user to obtain, via at least one graphical user interface (GUI) having at least one programmable GUI element, a permission from the user to monitor a plurality of calling-related activities executed within the mobile device; instruct, by the at least one processor of the call center server, the mobile device to continually monitor, in response to obtaining the permission from the user, the plurality of calling-related activities executed within the mobile device for a predetermined period of time; identify, by the at least one processor of the call center server, a digital fingerprint associated with the mobile device based on a determination of a plurality of device attributes within the predetermined period of time associated with the continual monitoring of the mobile device; automatically instruct, by the at least one processor of the call center server, an application of the mobile device to execute a plurality of operations in a background of the mobile device in response to an identification of a utilization of the digital fingerprint to access the mobile device; utilize, by the at least one processor of the call center server, a digital network to transmit a digital signal encoding the plurality of device attributes to a computing device associated with at least one call center agent, where the digital signal is configured to provide a uniformed translation of the plurality of device attributes associated with the mobile device; utilize, by the at least one processor of the call center server, a dynamic rules engine to determine a presence of the digital fingerprint associated with the mobile device within a pre-generated database of known digital fingerprints stored in an external data source; identify, by the at least one processor of the call center server, an incoming interaction session being initiated with the mobile device within the predetermined period of time subsequent to the determination of the presence of the digital fingerprint associated with mobile device within the pre-generated database of known digital fingerprints; automatically authenticate, by the at least one processor of the call center server and in response to identifying the incoming interaction session being initiated with the mobile device, at least one session interaction parameter to identify the incoming interaction session as an authenticated interaction session based on a predetermined threshold of confidence associated with the mobile device; and dynamically reduce, by the at least one processor of the call center server, a plurality of subsequent authentication steps required for the mobile device to execute at least one high-risk activity based on an overall confidence value associated with the mobile device meeting or exceeding the predetermined threshold of confidence.

Clause 19. The system according to clause 18, where the software instructions further include utilizing a trained machine learning algorithm to dynamically determine a predetermined level of risk associated with the mobile device by calculating an overall confidence value based on an aggregation of a calculated confidence value associated with the user, a calculated confidence value associated with the mobile device, and a calculated confidence value associated with the digital fingerprint.

Clause 20. The system according to clause 18 or 19, where the software instructions further include dynamically increasing the plurality of subsequent authentication steps required for the mobile device to execute the at least one high-risk activity based on the overall confidence value associated with the mobile device meeting or exceeding the predetermined threshold of confidence.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A computer-implemented method comprising:
   instructing, by at least one processor of a call center server, a mobile device associated with a user to obtain, via at least one graphical user interface (GUI) having at least one programmable GUI element, a permission from the user to monitor a plurality of calling-related activities executed within the mobile device;
   instructing, by the at least one processor of the call center server, the mobile device to continually monitor, in response to obtaining the permission from the user, the plurality of calling-related activities executed within the mobile device for a predetermined period of time;
   identifying, by the at least one processor of the call center server, a digital fingerprint associated with the mobile device based on a determination of a plurality of device attributes within the predetermined period of time associated with the continual monitoring of the mobile device;
   automatically instructing, by the at least one processor of the call center server, an application of the mobile device to execute a plurality of operations in a background of the mobile device in response to an identification of a utilization of the digital fingerprint to access the mobile device;
   utilizing, by the at least one processor of the call center server, a digital network to transmit a digital signal encoding the plurality of device attributes to a computing device associated with at least one call center agent, wherein the digital signal is configured to provide a uniformed translation of the plurality of device attributes associated with the mobile device;
   utilizing, by the at least one processor of the call center server, a dynamic rules engine to determine a presence of the digital fingerprint associated with the mobile device within a pre-generated database of known digital fingerprints stored in an external data source;
   identifying, by the at least one processor of the call center server, an incoming interaction session being initiated with the mobile device within the predetermined period of time subsequent to the determination of the presence of the digital fingerprint associated with mobile device within the pre-generated database of known digital fingerprints;
   automatically authenticating, by the at least one processor of the call center server and in response to identifying the incoming interaction session being initiated with the mobile device, at least one session interaction parameter to identify the incoming interaction session as an authenticated interaction session based on a predetermined threshold of confidence associated with the mobile device; and
   dynamically reducing, by the at least one processor of the call center server, a plurality of subsequent authentication steps required for the mobile device to execute at least one high-risk activity based on an overall confidence value associated with the mobile device meeting or exceeding the predetermined threshold of confidence.

2. The computer-implemented method of claim 1, wherein the mobile device is a mobile phone.

3. The computer-implemented method of claim 1, wherein at least one calling-related activity of the plurality of calling-related activities comprises determining a plurality of device attributes associate with the mobile device.

4. The computer-implemented method of claim 1, wherein the digital fingerprint associated with the mobile device comprises a unique personal identification number associated with a particular user of a plurality of users.

5. The computer-implemented method of claim 1, wherein the plurality of device attributes comprise additional information associated with the mobile device associated with a particular user.

6. The computer-implemented method of claim 1, wherein the dynamic rules engine comprises an artificial intelligence algorithm that compares at least one device fingerprint to a plurality of known device fingerprints stored on a server computing device.

7. The computer-implemented method of claim 1, wherein the dynamic rules engine identifies metadata associated with the mobile device based on the digital fingerprint.

8. The computer-implemented method of claim 1, further comprising utilizing a trained machine learning algorithm to dynamically determine a predetermined level of risk associated with the mobile device by calculating an overall confidence value based on an aggregation of a calculated confidence value associated with the user, a calculated confidence value associated with the mobile phone, and a calculated confidence value associated with the digital fingerprint.

9. The computer-implemented method of claim 1, further comprising dynamically increasing the plurality of subsequent authentication steps required for the mobile device to execute the at least one high-risk activity based on the overall confidence value associated with the mobile device meeting or exceeding the predetermined threshold of confidence.

10. A computer-implemented method comprising:

instructing, by at least one processor of a call center server, a mobile device associated with a user to obtain, via at least one graphical user interface (GUI) having at least one programmable GUI element, a permission from the user to monitor a plurality of calling-related activities executed within the mobile device;

instructing, by the at least one processor of the call center server, the mobile device to continually monitor, in response to obtaining the permission from the user, the plurality of calling-related activities executed within the mobile device for a predetermined period of time;

identifying, by the at least one processor of the call center server, a digital fingerprint associated with the mobile device based on a determination of the plurality of device attributes within the predetermined period of time associated with the continual monitoring of the mobile device;

automatically instructing, by the at least one processor of the call center server, an application of the mobile device to execute a plurality of operations in a background of the mobile device in response to an identification of a utilization of the digital fingerprint to access the mobile device;

utilizing, by the at least one processor of the call center server, a digital network to transmit a digital signal encoding the plurality of device attributes to a computing device associated with at least one call center agent, wherein the digital signal is configured to provide a uniformed translation of the plurality of device attributes associated with the mobile device;

utilizing, by the at least one processor of the call center server, a dynamic rules engine to determine a presence of the digital fingerprint associated with the mobile device within a pre-generated database of known digital fingerprints stored in an external data source;

utilizing, by the at least one processor of the call center server, a trained machine learning algorithm to dynamically determine a predetermined level of risk associated with the mobile device by calculating an overall confidence value based on an aggregation of a calculated confidence value associated with the user, a calculated confidence value associated with the mobile phone, and a calculated confidence value associated with the digital fingerprint;

identifying, by the at least one processor of the call center server, an incoming interaction session being initiated with the mobile device within the predetermined period of time subsequent to the determination of the presence of the digital fingerprint associated with mobile device within the pre-generated database of known digital fingerprints;

automatically authenticating, by the at least one processor of the call center server and in response to identifying the incoming interaction session being initiated with the mobile device, at least one session interaction parameter to identify the incoming interaction session as an authenticated interaction session based on a predetermined threshold of confidence associated with the mobile device and the predetermined level of risk associated with the overall confidence value; and dynamically increasing, by the at least one processor of the call center server, a plurality of subsequent authentication steps required for the mobile device to execute at least one high-risk activity based on an overall confidence value associated with the mobile device meeting or exceeding the predetermined threshold of confidence, and the predetermined level of risk associated with the overall confidence value.

11. The computer-implemented method of claim 10, wherein the mobile device is a mobile phone.

12. The computer-implemented method of claim 10, wherein at least one calling-related activity of the plurality of calling-related activities is determining a plurality of device attributes associate with the mobile device.

13. The computer-implemented method of claim 10, wherein the digital fingerprint associated with the mobile device comprises a unique personal identification number associated with a particular user of a plurality of users.

14. The computer-implemented method of claim 10, wherein the plurality of device attributes comprise additional information associated with the mobile device associated with a particular user.

15. The computer-implemented method of claim 10, wherein the dynamic rules engine comprises an artificial intelligence algorithm that compares at least one device fingerprint to a plurality of known device fingerprints stored on a server computing device.

16. The computer-implemented method of claim 10, wherein the dynamic rules engine identifies metadata associated with the mobile device based on the digital fingerprint.

17. The computer-implemented method of claim 10, wherein utilizing the training machine learning algorithm to dynamically determine the predetermined level of risk associated with the mobile device comprises calculating an overall confidence value based on an aggregation of a calculated confidence value associated with the user, a calculated confidence value associated with the mobile phone, and a calculated confidence value associated with the digital fingerprint.

18. A system includes:

a non-transient computer memory, storing software instructions; and at least one processor of a first computing device associated with a user;

wherein, when the at least one processor executes the software instructions, the first computing device is programmed to:

instruct, by at least one processor of a call center server, a mobile device associated with a user to obtain, via at least one graphical user interface (GUI) having at least one programmable GUI element, a permission from the user to monitor a plurality of calling-related activities executed within the mobile device;

instruct, by the at least one processor of the call center server, the mobile device to continually monitor, in response to obtaining the permission from the user, the plurality of calling-related activities executed within the mobile device for a predetermined period of time;

identify, by the at least one processor of the call center server, a digital fingerprint associated with the mobile device based on a determination of the plurality of device attributes within the predetermined period of time associated with the continual monitoring of the mobile device;

automatically instruct, by the at least one processor of the call center server, an application of the mobile device to execute a plurality of operations in a background of the mobile device in response to an identification of a utilization of the digital fingerprint to access the mobile device;

utilize, by the at least one processor of the call center server, a digital network to transmit a digital signal encoding the plurality of device attributes to a computing device associated with at least one call center agent, wherein the digital signal is configured to provide a uniformed translation of the plurality of device attributes associated with the mobile device;

utilize, by the at least one processor of the call center server, a dynamic rules engine to determine a presence of the digital fingerprint associated with the mobile device within a pre-generated database of known digital fingerprints stored in an external data source;

identify, by the at least one processor of the call center server, an incoming interaction session being initiated with the mobile device within the predetermined period of time subsequent to the determination of the presence of the digital fingerprint associated with mobile device within the pre-generated database of known digital fingerprints;

automatically authenticate, by the at least one processor of the call center server and in response to identifying the incoming interaction session being initiated with the mobile device, at least one session interaction parameter to identify the incoming interaction session as an authenticated interaction session based on a predetermined threshold of confidence associated with the mobile device; and dynamically reduce, by the at least one processor of the call center server, a plurality of subsequent authentication steps required for the mobile device to execute at least one high-risk activity based on an overall confidence value associated with the mobile device meeting or exceeding the predetermined threshold of confidence.

19. The system of claim 18, wherein the software instructions further comprise utilizing a trained machine learning algorithm to dynamically determine a predetermined level of risk associated with the mobile device by calculating an overall confidence value based on an aggregation of a calculated confidence value associated with the user, a calculated confidence value associated with the mobile phone, and a calculated confidence value associated with the digital fingerprint.

20. The system of claim 18, wherein the software instructions further comprise dynamically increasing the plurality of subsequent authentication steps required for the mobile device to execute the at least one high-risk activity based on the overall confidence value associated with the mobile device meeting or exceeding the predetermined threshold of confidence.

\* \* \* \* \*